United States Patent
Baer et al.

(10) Patent No.: US 6,206,803 B1
(45) Date of Patent: Mar. 27, 2001

(54) METHOD AND APPARATUS FOR OPERATING A CLUTCH IN AN AUTOMATED MECHANICAL TRANSMISSION

(75) Inventors: Kurt R. Baer, Toledo; Anand C. Patel, Sylvania; James A. Wheeler, Perrysburg, all of OH (US)

(73) Assignee: Tranmissiones TSP, S.A. DE C.V. (MX)

( * ) Notice: Subject to any disclaimer, the term of this patent is extended or adjusted under 35 U.S.C. 154(b) by 0 days.

(21) Appl. No.: 08/840,815

(22) Filed: Apr. 16, 1997

(51) Int. Cl.[7] .................................................. B60K 41/02

(52) U.S. Cl. .............................................. 477/174; 477/180

(58) Field of Search ................................ 477/74, 76, 86, 477/174, 175, 180, 181

(56) References Cited

U.S. PATENT DOCUMENTS

| | | |
|---|---|---|
| 2,208,865 | 7/1940 | Gette, Jr. . |
| 3,004,447 | 10/1961 | Sand . |
| 3,752,284 | 8/1973 | Brittain et al. . |
| 3,905,459 | 9/1975 | Liebich . |
| 3,942,393 | 3/1976 | Forster et al. . |
| 4,116,321 | 9/1978 | Miller . |
| 4,295,551 | 10/1981 | Zimmermann et al. . |
| 4,343,387 | 8/1982 | Hofbauer . |
| 4,418,810 | 12/1983 | Windsor . |
| 4,432,445 | 2/1984 | Windsor . |
| 4,488,625 | 12/1984 | Nobumoto et al. . |
| 4,535,879 | 8/1985 | Sturges . |
| 4,553,654 | 11/1985 | Bofinger et al. . |
| 4,591,038 | 5/1986 | Asagi et al. . |
| 4,618,043 | 10/1986 | Hattori et al. . |
| 4,632,231 | 12/1986 | Hattori et al. . |
| 4,662,496 | 5/1987 | Sakakiyama . |
| 4,730,712 | * 3/1988 | Ohkumo .................. 477/174 X |
| 4,874,070 | * 10/1989 | Nellums et al. .................... 477/76 X |
| 4,949,264 | 8/1990 | Katayama et al. . |
| 4,998,604 | 3/1991 | Vukovich et al. . |
| 5,002,170 | 3/1991 | Parsons et al. . |
| 5,029,678 | 7/1991 | Koshizawa . |
| 5,050,714 | 9/1991 | Kurihara et al. . |
| 5,056,639 | 10/1991 | Petzold et al. . |
| 5,060,158 | * 10/1991 | Kono et al. ...................... 477/175 X |
| 5,062,321 | 11/1991 | Koenig et al. . |
| 5,065,849 | 11/1991 | Kono et al. . |
| 5,067,599 | 11/1991 | Roder et al. . |
| 5,119,697 | 6/1992 | Vukovich et al. . |

(List continued on next page.)

FOREIGN PATENT DOCUMENTS

98/46907 * 10/1998 (WO) .

*Primary Examiner*—Sherry Estremsky
(74) *Attorney, Agent, or Firm*—MacMillan, Sobanski & Todd, LLC

(57) ABSTRACT

An apparatus and method for controlling the rate of engagement of a clutch in response to an indication provided by the driver, such as the depression of an accelerator pedal of the vehicle. The apparatus includes an electronic controller which initially determines a start rate as the minimum duty cycle which is required to modulate an engage valve in order to cause movement of a release bearing of the clutch in the engagement direction. Following the receipt of a signal from the operator of the vehicle to initiate the engagement of the clutch, the electronic controller calculates an initial transition rate of movement of the release bearing from a disengaged position to a transition point. The transition rate is determined as a function of the start rate and a position error signal. The position error signal can be calculated as the difference between the actual position of the release bearing and the transition point. When the release bearing reaches the transition point, the electronic controller re-sets the engagement rate to an approach rate for movement of the release bearing from the transition point to a kiss point. The approach rate is determined as a function of the start rate and an accelerator pedal position signal.

8 Claims, 6 Drawing Sheets

U.S. PATENT DOCUMENTS

| | | |
|---|---|---|
| 5,307,269 | 4/1994 | Kohno . |
| 5,314,050 | 5/1994 | Slicker et al. . |
| 5,316,116 | 5/1994 | Slicker et al. . |
| 5,332,073 | 7/1994 | Iizuka . |
| 5,378,211 | 1/1995 | Slicker et al. . |
| 5,393,274 * | 2/1995 | Smedley ................................ 477/74 |
| 5,413,542 | 5/1995 | Jarvis . |
| 5,634,867 * | 6/1997 | Mack ................................ 477/86 X |

* cited by examiner

METHOD AND APPARATUS FOR OPERATING A CLUTCH IN AN AUTOMATED MECHANICAL TRANSMISSION

BACKGROUND OF THE INVENTION

This invention relates in general to vehicle transmissions and in particular to a method and apparatus for automatically controlling the operation of a clutch for use with an automated mechanical transmission in a vehicle drive train assembly.

In virtually all land vehicles in use today, a transmission is provided in a drive train between a source of rotational power, such as an internal combustion or diesel engine, and the driven axle and wheels of the vehicle. A typical transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

To facilitate the operation of the transmission, it is well known to provide a clutch between the vehicle engine and the transmission. When the clutch is engaged, the transmission is driven by the vehicle engine to operate the vehicle at a selected gear ratio. To shift the transmission from a first gear ratio to a second gear ratio, the clutch is initially disengaged such that power is not transmitted from the vehicle engine to the transmission. This allows the gear shifting operation to occur within the transmission under a non-torque loading condition to prevent undesirable clashing of the meshing gear teeth. Thereafter, the clutch is re-engaged such that power is transmitted from the vehicle engine to the transmission to operate the vehicle at the second gear ratio.

A typical structure for a vehicle clutch includes a cover which is connected to a flywheel secured to the end of the output shaft of the vehicle engine for rotation therewith. A pressure plate is disposed within the clutch between the cover and the flywheel. The pressure plate is connected for rotation with the flywheel and the cover, but is permitted to move axially relative thereto. Thus, the flywheel, the cover, and the pressure plate are all constantly rotatably driven by the vehicle engine. Between the flywheel and the pressure plate, a driven disc assembly is disposed. The driven disc assembly is supported on the input shaft of the transmission for rotation therewith, but is permitted to move axially relative thereto. To engage the clutch, the pressure plate is moved axially toward the flywheel to an engaged position, wherein the driven disc assembly is frictionally engaged between the flywheel and the pressure plate. As a result, the driven disc assembly (and the input shaft of the transmission upon which it is supported) are driven to rotate with the flywheel, the cover, and the pressure plate. To disengage the clutch, the pressure plate is moved axially away from the flywheel to a disengaged position. When the pressure plate is moved axially to this disengaged position, the driven disc assembly is not frictionally engaged between the flywheel and the pressure plate. As a result, the driven disc assembly (and the input shaft of the transmission upon which it is supported) are not driven to rotate with the flywheel, the cover, and the pressure plate.

To effect such axial movement of the pressure plate between the engaged and disengaged positions, most vehicle clutches are provided with a release assembly including a generally hollow cylindrical release sleeve which is disposed about the output shaft of the clutch. The forward end of the release sleeve extends within the clutch and is connected through a plurality of levers or other mechanical mechanism to the pressure plate. In this manner, axial movement of the release sleeve causes corresponding axial movement of the pressure plate between the engaged and disengaged positions. Usually, one or more engagement springs are provided within the clutch to urge the pressure plate toward the engaged position. The engagement springs typically react between the release sleeve and the cover to normally maintain the clutch in the engaged condition. The rearward end of the release sleeve extends outwardly from the clutch through a central opening formed through the cover. Because the release sleeve is connected to the cover and the pressure plate of the clutch, it is also constantly driven to rotate whenever the vehicle engine is operating. Thus, an annular release bearing is usually mounted on the rearward end of the release sleeve. The release bearing is axially fixed on the release sleeve and includes an inner race which rotates with release sleeve, an outer race which is restrained from rotation, and a plurality of bearings disposed between the inner race and the outer race to accommodate such relative rotation. The non-rotating outer race of the release bearing is typically engaged by an actuating mechanism for moving the release sleeve (and, therefore, the pressure plate) between the engaged and disengaged positions to operate the clutch.

In a conventional mechanical transmission, both the operation of the clutch and the gear shifting operation in the transmission are performed manually by an operator of the vehicle. For example, the clutch can be disengaged by depressing a clutch pedal located in the driver compartment of the vehicle. The clutch pedal is connected through a mechanical linkage to the outer race of the release bearing of the clutch such that when the clutch pedal is depressed, the pressure plate of the clutch is moved from the engaged position to the disengaged position. When the clutch pedal is released, the engagement springs provided within the clutch return the pressure plate from the disengaged position to the engaged position. Similarly, the gear shifting operation in the transmission can be performed when the clutch is disengaged by manually moving a shift lever which extends from the transmission into the driver compartment of the vehicle. Manually operated clutch/transmission assemblies of this general type are well known in the art and are relatively simple, inexpensive, and lightweight in structure and operation. Because of this, the majority of medium and heavy duty truck clutch/transmission assemblies in common use today are manually operated.

More recently, however, in order to improve the convenience of use of manually operated clutch/transmission assemblies, various structures have been proposed for partially or fully automating the shifting of an otherwise manually operated transmission. In a partially or fully automated manual transmission, the driver-manipulated clutch pedal may be replaced by an automatic clutch actuator, such as a hydraulic or pneumatic actuator. The operation of the automatic clutch actuator can be controlled by an electronic controller or other control mechanism to selectively engage and disengage the clutch without manual effort by the driver. Similarly, the driver-manipulated shift lever may also be replaced by an automatic transmission actuator, such as a hydraulic or pneumatic actuator which is controlled by an electronic controller or other control mechanism to select and engage desired gear ratios for use.

In both manually operated transmissions and in partially or fully automated manual transmissions, one of the most difficult operations to perform is to initially launch the vehicle from at or near a stand-still. This is because the force required to overcome the inertia of the vehicle is the greatest when attempting to initially accelerate the vehicle from at or near zero velocity. This relatively large amount of inertial force results in a relatively large load being placed on the vehicle engine when the clutch is engaged during a vehicle launch. Thus, the movement of the release bearing from the disengaged position to the engaged position must be carefully controlled during the initial launch of the vehicle to prevent the engine from stalling and to avoid undesirable sudden jerking movement of the vehicle. Although the same considerations are generally applicable when re-engaging the clutch during subsequent shifting operations in the higher gear ratios of the transmissions, the control of the movement of the release bearing from the disengaged position to the engaged position has been found to be less critical when shifting among such higher gear ratios because a much lesser force is required to overcome the inertia of the vehicle when the vehicle is already moving.

To address these considerations, the total movement of the release bearing from the disengaged position to the engaged position can be divided into three ranges of movement. The first range of movement is from the disengaged position to a first intermediate position (referred to as the transition point). The transition point is selected to be relatively near, but spaced apart from, the position of the release bearing at which the driven disc assembly of the clutch is initially engaged by the flywheel and the pressure plate. Thus, during this first range of movement (referred to as the transition movement), the clutch is completely disengaged, and no torque is transmitted through the clutch to the transmission. The second range of movement is from the transition point to a second intermediate position (referred to as the kiss point). The kiss point is the position of the release bearing at which the driven disc assembly is initially engaged by the flywheel and the pressure plate. Thus, during this second range of movement (referred to as the approach movement) from the transition point to the kiss point, the clutch is disengaged until the release bearing reaches the kiss point, at which point the first measurable amount of torque is transmitted through the clutch to the transmission. The third range of movement of the release bearing is from the kiss point to the engaged position. The engaged position is the position of the release bearing at which the driven disc assembly is completely engaged by the flywheel and the pressure plate. Thus, during this third range of movement (referred to as the engagement movement), the clutch is gradually engaged so as to increase the amount of torque which is transmitted through the clutch to the transmission from the first measurable amount at the kiss point to the fall capacity of the clutch at the engaged position.

As mentioned above, during the transition movement and the approach movement of the release bearing from the disengaged position to the kiss point, the clutch is disengaged until the release bearing reaches the kiss point. Thus, it is desirable that this transition and approach movement of the release bearing be accomplished as quickly as possible to minimize the time duration of the gear shifting operation. In the past, both the rate of the transition movement (referred to as the transition rate) and the rate of the approach movement (referred to as the approach rate) have been set at a constant, relatively fast speed. However, it has been found that such a constant rate may not be well suited for all of the varying conditions under which the vehicle may be operated. For example, if the driver depresses the accelerator pedal of the vehicle rapidly, it can be inferred that a more aggressive acceleration of the vehicle is desired than if the accelerator pedal is depressed in a normal manner. Thus, it would be desirable to provide an apparatus and method for controlling the rate of engagement of a clutch in a partially or fully automated mechanical transmission in response to an indication provided by the driver, such as the depression of an accelerator pedal of the vehicle.

SUMMARY OF THE INVENTION

This invention relates to an apparatus and method for controlling the rate of engagement of a clutch in response to an indication provided by the driver, such as the depression of an accelerator pedal of the vehicle. The apparatus includes an electronic controller which initially determines a start rate as the minimum duty cycle which is required to modulate an engage valve in order to cause movement of a release bearing of the clutch in the engagement direction. Following the receipt of a signal from the operator of the vehicle to initiate the engagement of the clutch, the electronic controller calculates an initial transition rate of movement of the release bearing from a disengaged position to a transition point. The transition rate is determined as a function of the start rate and a position error signal. The position error signal can be calculated as the difference between the actual position of the release bearing and the transition point. When the release bearing reaches the transition point, the electronic controller re-sets the engagement rate to an approach rate for movement of the release bearing from the transition point to a kiss point. The approach rate is determined as a function of the start rate and an accelerator pedal position signal.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
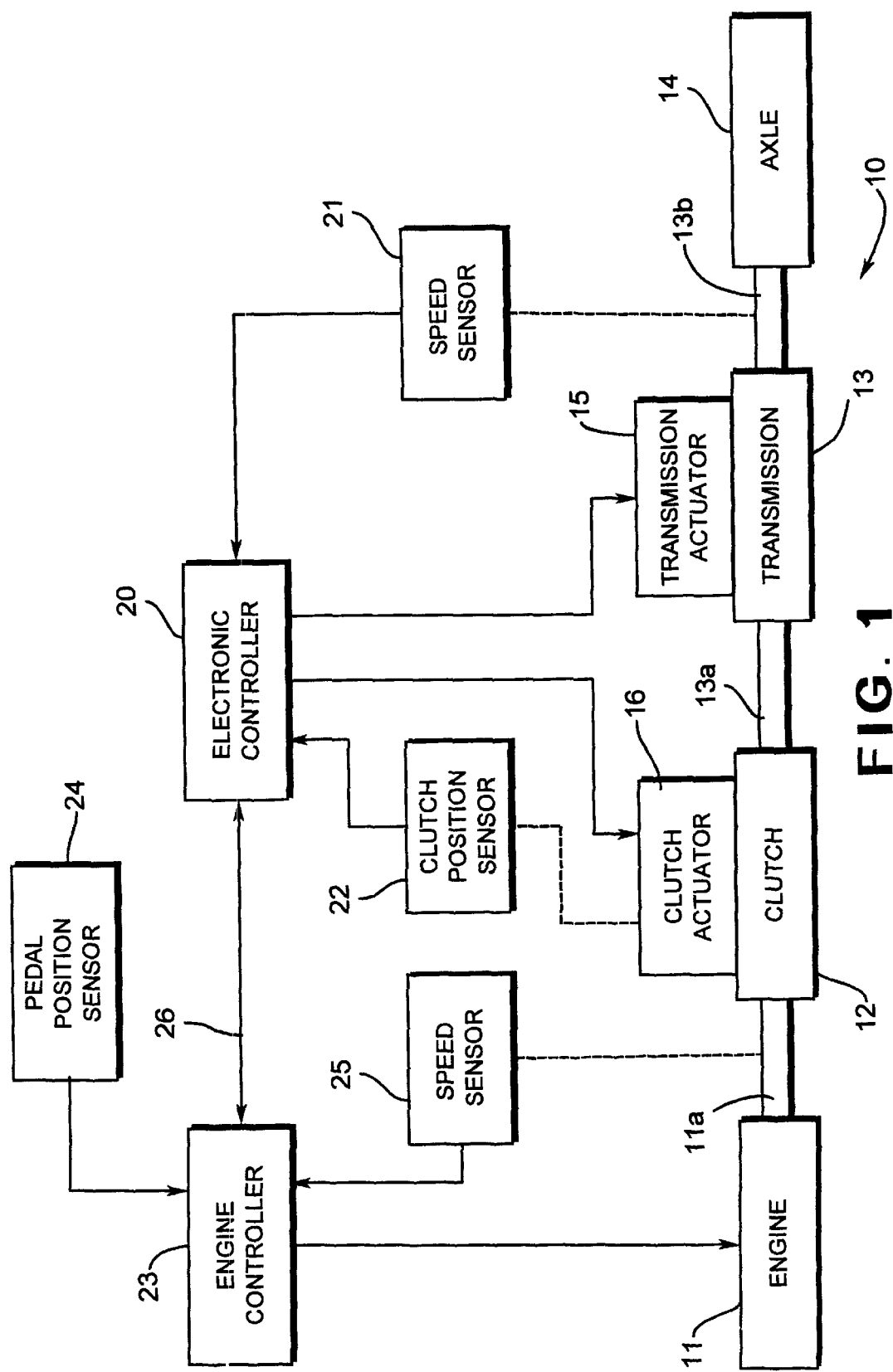
FIG. 1 is a block diagram of a vehicle drive train assembly including an electronic controller in accordance with this invention.

Referring now to the drawings, there is illustrated in FIG. 1 a block diagram of a vehicle drive train assembly, indicated generally at 10. The drive train assembly 10 includes a conventional engine 11 or other source of rotational power. The engine 11 is connected through an output shaft 11a, such as a crankshaft of the engine 11, to a clutch 12. The clutch 12 is also conventional in the art and functions to selectively connect the output shaft 11a of the engine 11 to an input shaft 13a of a transmission 13. The transmission 13 contains a plurality of meshing gears (not shown) which are selectively connected between the input shaft 13a and an output shaft 13b. The meshing gears contained within the transmission 13 are of varying size so as to provide a plurality of such gear ratios. By appropriately shifting among these various gear ratios, a desired speed reduction gear ratio can be provided between the input shaft 13a and the output shaft 13b. Consequently, acceleration and deceleration of the vehicle can be accomplished in a smooth and efficient manner. The output shaft 13b is connected to a conventional axle assembly 14. The axle assembly 14 includes one or more wheels which are rotatably driven by the engine 11 whenever the clutch 12 and the transmission 13 are engaged. This general structure for the drive train assembly 10 is well known in the art.

The illustrated transmission 13 may be either a partially or fully automated mechanical transmission. In a typical partially automated manual transmission, a driver-manipulated shift lever (not shown) engages and moves certain ones of a plurality of shift rails contained within the transmission to engage a first set of gear ratios for use. However, an automatically shifting transmission actuator 15 is provided on the transmission 13 to engage and move the remaining shift rails to engage a second set of gear ratios for use. For example, it is known to provide a partially automated manual transmission wherein the lower gear ratios are manually selected and engaged by the vehicle driver using the shift lever, while the higher gear ratios are automatically selected and engaged by the transmission actuator 15. One example of a typical partially automated manual transmission of this general structure is disclosed in detail in U.S. Pat. No. 5,450,767, owned by the assigned of this application. The disclosure of that patent is incorporated herein by reference. In a fully automated manual transmission, the driver-operated shift lever is usually replaced by the transmission actuator 15. The transmission actuator 15 functions to shift all of the shift rails contained within the transmission so as to select and engage all of the available gear ratios. The above-referenced patent discusses the adaptability of the disclosed partially automated transmission actuator 15 to fully automate the shifting of the transmission disclosed therein.

To facilitate the automatic shifting of the transmission 15, the clutch 12 is provided with a clutch actuator 16. The structure and operation of the clutch actuator 16 will be discussed further below. Briefly, however, the clutch actuator 16 is provided to replace a driver-manipulated clutch pedal so as to partially or fully automate the operation of the clutch 12. The clutch actuator 16 is effective to operate the clutch 12 in either an engaged or disengaged mode. When the clutch 12 is engaged, the transmission 13 is driven by the vehicle engine 11 to operate the vehicle at a selected gear ratio. To shift the transmission 13 from a first gear ratio to a second gear ratio, the clutch 12 is initially disengaged such that power is not transmitted from the vehicle engine 11 to the transmission 13. This allows the transmission actuator 15 to effect a gear shifting operation within the transmission 13 under a non-torque loading condition to prevent undesirable clashing of the meshing gear teeth. Thereafter, the clutch 12 is re-engaged such that power is transmitted from the vehicle engine 11 to the transmission 13 to operate the vehicle at the second gear ratio.

The operation of the clutch actuator 16 and the transmission actuator 15 are controlled by an electronic controller 20. The electronic controller 20 can be embodied as any conventional microprocessor or similar computing apparatus which can be programmed to operate the clutch actuator 16 (to effect automatic disengagement and engagement of the clutch 12) and the transmission actuator 15 (to effect automatic shifting of the transmission 13 when the clutch 12 is disengaged) as described above. The operation of the electronic controller 20 will be described in detail below. A transmission output shaft speed sensor 21 provides an input signal to the electronic controller 20. The transmission-output shaft speed sensor 21 is conventional in the art and is adapted to generate an electrical signal which is representative of the actual rotational speed of the output shaft 13b of the transmission 13. A clutch position sensor 22 also provides an input signal to the electronic controller 20. The structure and operation of the clutch position sensor 22 will be described below.

An engine controller 23 is provided to control the operation of the vehicle engine 11. The engine controller 23 can also be embodied as any conventional microprocessor or similar computing apparatus which can be programmed to operate the engine 11 in a desired manner. Primarily, the engine controller 23 controls the operation of the engine 11 in response to an input signal generated by an accelerator pedal position sensor 24. The accelerator pedal position sensor 24 is conventional in the art and is adapted to generate an electrical signal which is representative of the actual position of the accelerator pedal (not shown) of the vehicle. As is well known, the accelerator pedal is physically manipulated by the foot of the driver of the vehicle to control the operation thereof. The accelerator pedal is depressed by the driver when it is desired to increase the speed of the engine 11 and move the vehicle. Conversely, the accelerator pedal is released when it is desired to decrease the speed of the engine 11 to slow or stop such movement of the vehicle. Thus, the engine controller 23 controls the speed of the engine 11 in response to the signal from the accelerator pedal position sensor 24 so as to operate the vehicle as desired by the driver. The accelerator pedal position sensor 24 may, if desired, be replaced by a throttle position sensor (not shown) or other driver-responsive sensor which generates a signal which is representative of the desired speed or mode of operation of the vehicle. A second input to the engine controller 23 is an engine output shaft speed sensor 25. The engine output shaft speed sensor 25 is conventional in the art and is adapted to generate an electrical signal which is representative of the actual rotational speed of the output shaft 11a of the engine 11.

The electronic controller 20 and the engine controller 23 communicate with one another over a data bus line 26 extending therebetween. In a manner which is generally conventional in the art, the electronic controller 20 and the engine controller 23 are programmed to communicate and cooperate with one another to so as to control the operation of the vehicle in a manner desired by the driver of the vehicle. Specifically, the electronic controller 20 and the engine controller 23 are effective to control the operation of the engine 11, the clutch 12, and the transmission 13 in such a manner that the vehicle can be started and stopped solely by physical manipulation of the accelerator and brake pedals, similar to a conventional automatic transmission in a passenger car. To accomplish this, the signals from the accelerator pedal position sensor 24 and the engine output shaft speed sensor 25 are available to the electronic controller 20 over the data bus line 26. Alternatively, the signals from the accelerator pedal position sensor 24 and the engine output shaft speed sensor 25 can be fed directly to the electronic controller 20.

Figure 2:
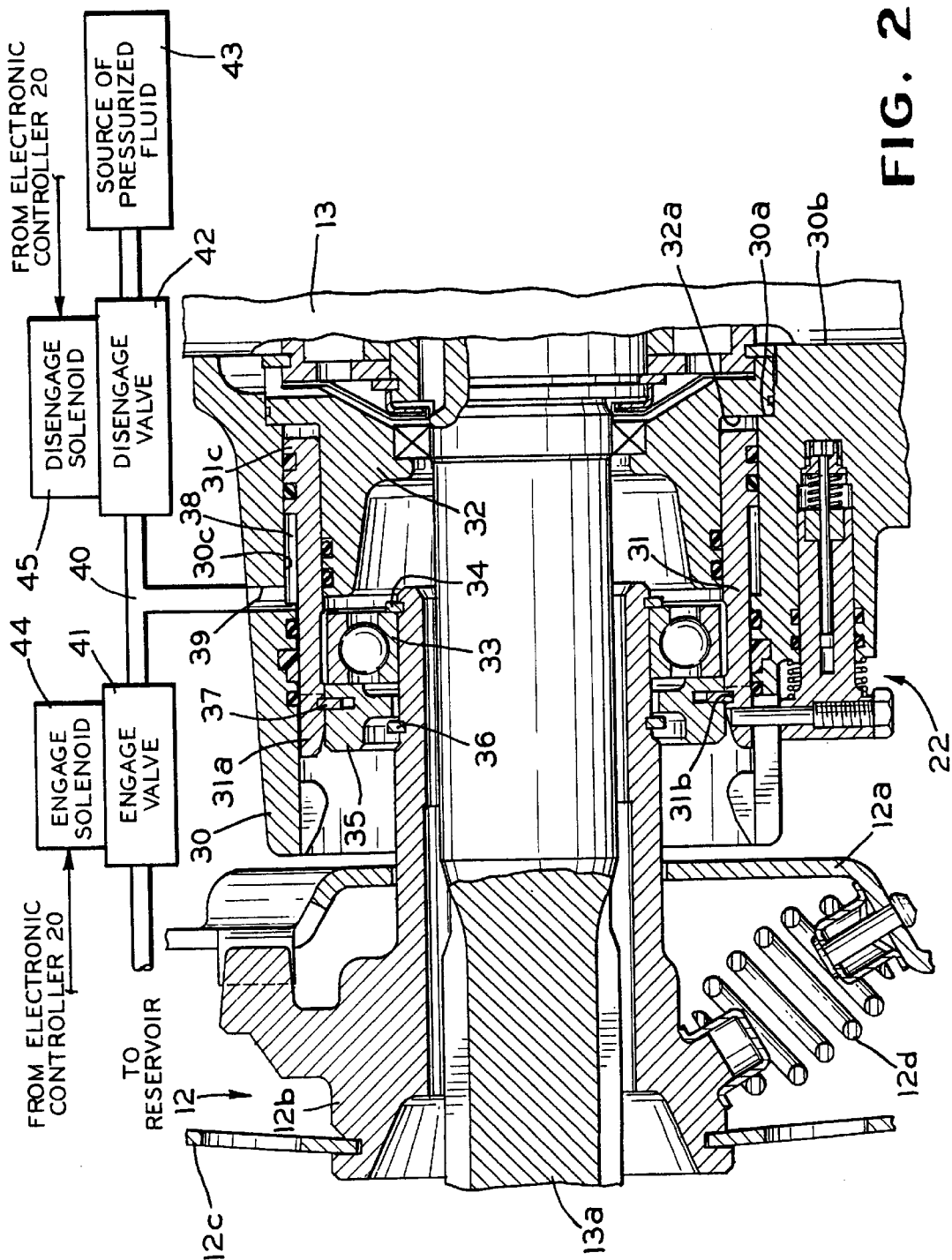
FIG. 2 is sectional elevational view of the clutch actuator and portions of the clutch and transmission illustrated in FIG. 1 showing the clutch actuator and the clutch in a disenengaged position, together with a block diagram of the valves and related control circuitry for operating the clutch actuator and the clutch.

Referring now to FIG. 2, the clutch actuator 16 and portions of the clutch 12 and the transmission 13 are illustrated in detail. The structure and operation of the clutch actuator 16 are disclosed and illustrated in detail in co-pending application Ser. No. 08/775,460, filed Dec. 30, 1996 (owned by the assigned of this invention), the disclosure of which is incorporated herein by reference. Briefly, however, the clutch actuator 16 includes an outer cylinder housing 30, a hollow cylindrical piston 31, and an inner cylinder housing 32. The piston 31 has at least one, and preferably a plurality, of axially forwardly projecting protrusions 31a, each of which has a circumferentially extending groove 31b formed therein. To assemble the clutch actuator 16, the piston 31 is initially disposed concentrically within the outer cylinder housing 30, and the inner cylinder housing 32 is disposed concentrically within the piston 31. Then, the outer cylinder housing 30 is secured to a forwardly facing surface of a case of the transmission 13 by threaded fasteners (not illustrated) or other means. When this is done, a forwardly facing surface 32a of the inner cylinder housing 32 abuts a complementary shaped, rearwardly facing annular surface 30a formed within the outer cylinder housing 30. At the same time, a rearwardly facing surface 30b of the outer cylinder housing 30 abuts portions of the case of the transmission 13. Thus, the inner cylinder housing 32 is captured between the case of the transmission 13 and the outer cylinder housing 30 so as to be fixed in position relative thereto. At the same time, a circumferential rim portion 31c of the piston 31 is received in an undercut 30c formed in the interior of the outer cylinder housing 30. Thus, the piston 31 is capable of limited axial movement relative to the outer cylinder housing 30 and the inner cylinder housing 32.

The clutch 12 is a conventional pull-to-release type clutch and includes a cover 12a which is connected to a flywheel (not illustrated) which, in turn, is connected to the output shaft 11a of the engine 11. The flywheel and the cover 12a are thus rotatably driven by the engine 11 of the vehicle for rotation about an axis. The cover 12a has a central opening formed therethrough which receives a hollow, generally cylindrical release sleeve 12b. The release sleeve 12b is disposed concentrically about the transmission input shaft 13a. A driven disc assembly (not shown) is mounted within the clutch 12 on the forward end of the transmission input shaft 13a for rotation therewith and for axial movement relative thereto. When the clutch 12 is engaged, torque is transmitted from the driven disc assembly to the transmission input shaft 13a in a known manner. When the clutch 12 is disengaged, no torque is transmitted from the driven disc assembly to the transmission input shaft 13a.

A forward end of the release sleeve 12b has an annular groove formed thereabout which receives the radially innermost ends of a plurality of clutch operating levers 12c therein. Thus, axial movement of the release sleeve 12b causes pivoting movement of the clutch operating levers 12c which, in turn, causes engagement and disengagement of the clutch 12 in a known manner. A plurality of clutch engagement springs 12d (only one of which is illustrated) reacts between the cover 12a and the forward end of the release sleeve 12b. The ends of the clutch engagement springs 12d are preferably supported on respective seats provided on the release sleeve 12b and the cover 12a. The springs 12d urge the release sleeve 12b axially forwardly (toward the left when viewing FIG. 2) toward an engaged position, wherein the components of the clutch 12 are frictionally engaged so as to cause the transmission input shaft 13a to be rotatably driven by the engine 11. When the release sleeve 12b is moved axially rearwardly (toward the right when viewing FIG. 2) against the urging of the engagement springs 12d toward a disengaged position, the components of the clutch 12 are frictionally disengaged so as to prevent the transmission input shaft 13a from being rotatably driven by the engine 11.

The rearward end of the release sleeve 12b extends axially rearwardly through the central opening in the cover 12a. An annular release bearing 33 is disposed about the rearward end of the release sleeve 12b and is retained on one side by a snap ring 34 disposed within an annular groove. A retaining ring 35 is also disposed about the rearward end of the release sleeve 12b adjacent to the forward side of the release bearing 33. A snap ring 36 is disposed in an annular groove in the release sleeve 12b to retain the retaining ring 35 on the release sleeve 12b. Thus, the release bearing 33 and the retaining ring 35 are secured to the release sleeve 12b for axial movement therewith. A snap ring 37 is disposed within the groove formed in the outer surface of the retaining ring 35. The snap ring 37 connects the piston 31 with the retaining ring 35 such that axial movement of the piston 31 causes corresponding axial movement of the retaining ring 35, the release bearing 33, and the release sleeve 12b.

An annular chamber 38 is defined between the outer surface of the body of the piston 31, the enlarged rim portion 31 c formed at the rearward end of the piston 31, and the undercut 30c formed in the inner surface of the outer cylinder housing 30. The chamber 38 is sealed to form a fluid-tight chamber by sealing elements, such as O-rings. A radially extending port 39 is formed through the outer cylinder housing 30. As will be explained in detail below, pressurized fluid (hydraulic or pneumatic, as desired) is supplied through the port 39 used to effect axial movement of the piston 31 in one direction relative to the outer cylinder housing 30 and the inner cylinder housing 31.

The clutch position sensor 22 is mounted on the outer cylinder housing 30 for generating an electrical signal which is representative of the axial position of the piston 31 relative to the outer and inner cylinder housings 30 and 32. Such an electrical position signal is used by an electronic controller 20 for automatically operating the clutch actuator 16 in a manner described in detail below. The clutch position sensor 22 is conventional in the art.

The port 39 communicates through a conduit 40 with an engage valve 41 and a disengage valve 42. The engage valve 41 communicates with a reservoir (in hydraulic systems) or the atmosphere (in pneumatic systems), while the disengage valve 42 communicates with a source of pressurized fluid 43, either hydraulic or pneumatic as desired. The operation of the engage valve 41 is controlled by an engage solenoid 44, while the operation of the disengage valve 42 is controlled by a disengage solenoid 45. The engage solenoid 44 and the disengage solenoid 45 are, in turn, connected to the electronic controller 20 so as to be selectively operated thereby.

The clutch 12 is normally maintained in the engaged position under the influence of the engagement springs 12d. When it is desired to disengage the clutch 12, the engage solenoid 44 is actuated by the electronic controller 20 to close the engage valve 41, and the disengage solenoid 45 is actuated by the electronic controller 20 to open the disengage valve 42. As a result, pressurized fluid from the source 43 is supplied to the chamber 38, causing the piston 31 to move rearwardly (toward the right when viewing FIG. 2) against the urging of the engagement springs 12d. As discussed above, such rearward movement of the piston 31 causes the clutch 12 to be disengaged. For several reasons which are well known in the art, the disengage valve 42 is operated by the electronic controller 20 in an on-off manner, i.e., either wide open or completely closed.

When it is desired to subsequently re-engage the clutch 12, the engage solenoid 44 is actuated by the electronic controller 20 to open the engage valve 41, and the disengage solenoid 45 is actuated by the electronic controller 20 to close the disengage valve 42. As a result, the chamber 38 is vented to the reservoir, causing the piston 31 to move forwardly (toward the left when viewing FIG. 2) under the influence of the engagement springs 12d. As discussed above, such forward movement of the piston 31 causes the clutch 12 to be engaged. For several reasons which are well known in the art, the engage valve 44 is operated using pulse width modulation techniques to control the engagement of the clutch 12. The electronic controller 20 varies the duty cycle of the pulse width modulation of the engage valve 41 so as to adjust the rate at which the pressurized fluid in the chamber 38 is vented to the reservoir. By adjusting the rate of venting of the chamber 38 in this manner, the speed at which the release bearing 33 is moved from the disengaged position to the engaged position can be precisely controlled. Precise control of the speed of movement of the release bearing is from the disengaged position to the engaged position is important to engage the clutch 12 smoothly and avoid undesirable sudden jerking movement of the vehicle.

As discussed above, the total movement of the release bearing 33 from the disengaged position to the engaged position can be divided into three ranges of movement. The first range of movement of the release bearing 33 is from the disengaged position to a first intermediate position (referred to as the transition point). The transition point is selected to be relatively near, but spaced apart from, the position of the release bearing 33 at which the driven disc assembly of the clutch 12 is initially engaged by the flywheel and the pressure plate. Thus, during this first range of movement (referred to as the transition movement), the clutch 12 is completely disengaged, and no torque is transmitted through the clutch 12 to the transmission 13. The second range of movement of the release bearing 33 is from the transition point to a second intermediate position (referred to as the kiss point). The kiss point is the position of the release bearing 33 at which the driven disc assembly is initially engaged by the flywheel and the pressure plate. Thus, during this second range of movement (referred to as the approach movement) from the transition point to the kiss point, the clutch 12 is disengaged until the release bearing 33 reaches the kiss point, at which point the first measurable amount of torque is transmitted through the clutch 12 to the transmission 13. The third range of movement of the release bearing 33 is from the kiss point to the engaged position. The engaged position is the position of the release bearing 33 at which the driven disc assembly is completely engaged by the flywheel and the pressure plate. Thus, during this third range of movement (referred to as the engagement movement), the clutch 12 is gradually engaged so as to increase the amount of torque which is transmitted through the clutch 12 to the transmission 13 from the first measurable amount at the kiss point to the full capacity of the clutch 12 at the engaged position.

In order to initiate any movement of the release bearing 33 of the clutch 12 in the engagement direction, the engage valve 41 must be modulated at a certain minimum duty cycle, which is referred to herein as the start rate. Thus, the start rate can be defined as the minimum duty cycle which is required to modulate the engage valve 41 in order to cause movement of the release bearing 33 in the engagement direction. It will be appreciated that the start rate is dependent upon a number of factors, including the structure and condition of the release bearing 33 and its associated mechanical components, the strength of the engagement springs 12d, and the like. It has been found that the magnitude of the start rate will vary during use in response to many factors, such as temperature, mechanical wear, and the like. To optimize the operation of the clutch 12, it would be desirable to determine the actual start rate prior to engagement of the clutch 12.

Figure 3A:
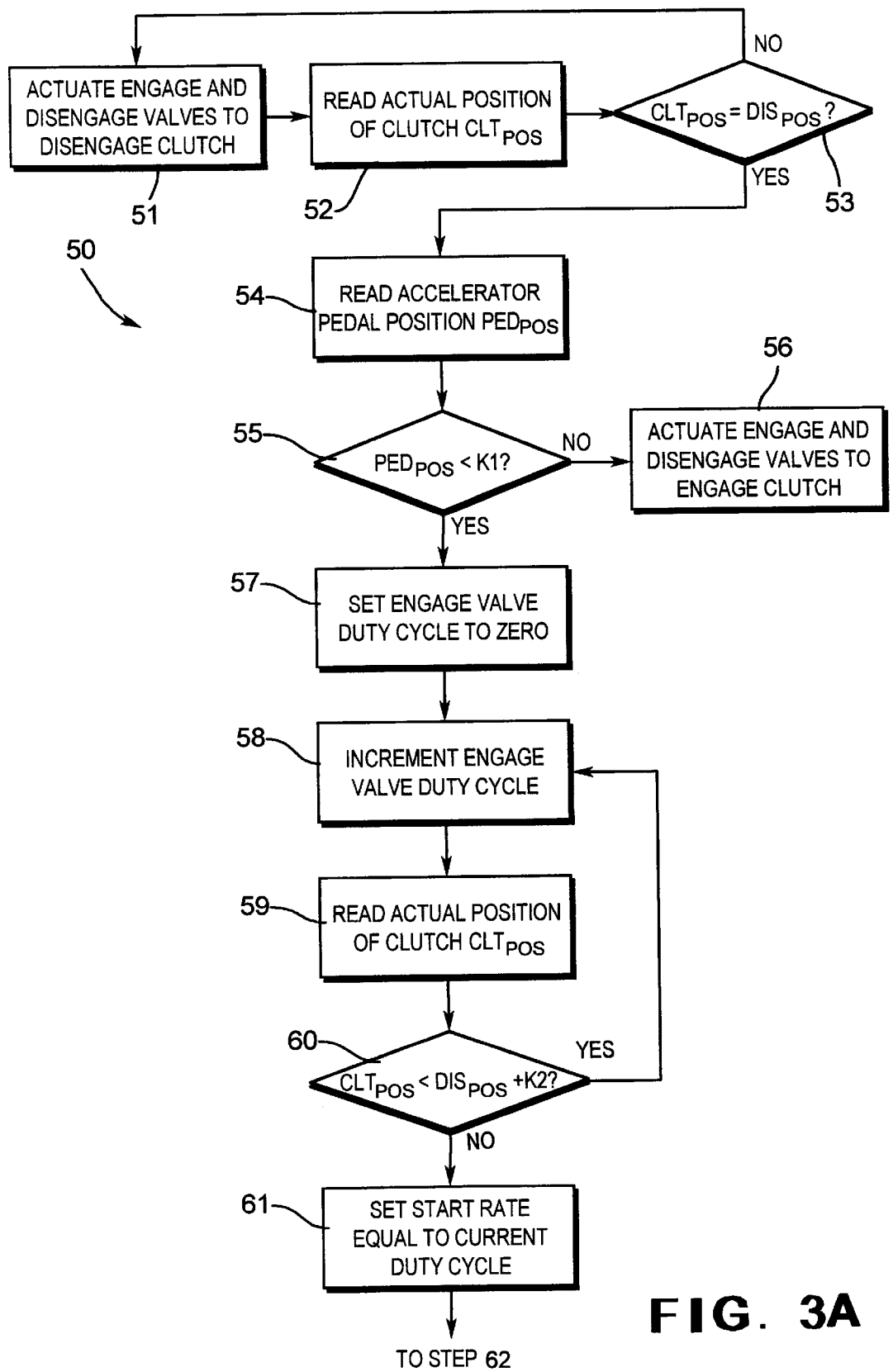
FIGS. 3A and 3B are a flow chart of an algorithm for determining a start rate for controlling the movement of the release bearing of the clutch in its engagement movement from the disengaged position to the kiss point.

Referring now to FIG. 3A, there is illustrated a first portion of a flow chart of an algorithm, indicated generally at 50, for determining a start rate for controlling the movement of the release bearing 33 of the clutch 12 in its engagement movement from the disengaged position to the kiss point. In the first step 51 of the algorithm 50, the engage valve 41 and the disengage valve 42 are actuated by the electronic controller 20 to disengage the clutch 12. Thus, the release bearing 33 of the clutch 12 is moved to the disengaged position $DIS_{POS}$. Next, the second step 52 of the algorithm 50 causes the electronic controller 20 to read the actual position $CLT_{POS}$ of the release bearing 33 of the clutch 12 from the clutch position sensor 22. As discussed above, the clutch position sensor 22 is adapted to generate an electrical signal which is representative of the axial position of the piston 31 relative to the outer and inner cylinder housings 30 and 32 and, therefore, the actual position of the release bearing 33. Next, the algorithm 50 enters a first decision point 53 wherein the actual position $CLT_{POS}$ of the release bearing 33 is compared with the disengaged position $DIS_{POS}$. If the release bearing 33 is not at the disengaged position $DIS_{POS}$, the algorithm 50 branches back to the first step 51. Thus, it will be appreciated that algorithm 50 for determining the start rate is not continued until the release bearing 33 of the clutch 12 is in the disengaged position $DIS_{POS}$.

If the release bearing 33 of the clutch 12 is in the disengaged position $DIS_{POS}$, the algorithm 50 branches from the first decision point 53 to a step 54 wherein the electronic controller 20 reads the accelerator pedal position signal $PED_{POS}$ from the engine controller 23. As discussed above, the accelerator pedal position sensor 24 generates the accelerator pedal position signal $PED_{POS}$ to the engine controller 23 which is representative of the actual position of the accelerator pedal of the vehicle. That information is available to the electronic controller 20 from the engine controller 23 over the data bus line 26. The algorithm 50 next enters a second decision point 55 wherein the accelerator pedal position signal $PED_{POS}$ is compared with a first constant value K1. The first constant value K1 is selected to be relatively small, corresponding to essentially no depression of the accelerator pedal of the vehicle by the operator. If the accelerator pedal position signal $PED_{POS}$ is greater than or equal to the first constant value K1, then it is assumed that the operator wishes to move the vehicle. Thus, the algorithm 50 branches from the second decision point 55 to a step 56 wherein the engage valve 41 and the disengage valve 42 are actuated (by means of the respective solenoids 44 and 45) to effect movement of the release bearing 33 of the clutch 12 according to the selected engagement rate. Thus, the start rate determination process is ended, and the clutch engagement process is initiated when the accelerator pedal is sufficiently depressed. If no start rate has yet been determined, a default rate programmed into the electronic controller 20 may be used until such a determination can be made.

If the accelerator pedal position signal $PED_{POS}$ is less than the first constant value K1, the algorithm 50 enters a step 57 wherein the duty cycle of the engage valve 41 is set to zero. Alternatively, the duty cycle of the engage valve 41 may be set to a predetermined relatively small value which is known to be less than the start rate. Then, the algorithm 50 enters a step 58 wherein the duty cycle of the engage valve 41 is incremented by a predetermined amount. In the next step 59 of the algorithm 50, the electronic controller 20 again reads the actual position $CLT_{POS}$ of the release bearing 33 of the clutch 12 from the clutch position sensor 22. Then, the algorithm 50 enters a third decision point 60 wherein the actual position $CLT_{POS}$ of the release bearing 33 is compared with a second constant value K2 relative to the disengaged position $DIS_{POS}$. The second constant value K2 is selected to represent a predetermined relatively small amount of movement of the release bearing 33 of the clutch 12 in the engagement direction away from the disengaged position $DIS_{POS}$. If the actual position $CLT_{POS}$ of the release bearing 33 is less than the sum of the second constant value K2 with the disengaged position $DIS_{POS}$, then it is assumed that the current duty cycle of the engage valve 41 is insufficient to cause significant movement of the release bearing 33 of the clutch 12 in the engaged direction. Thus, the algorithm 50 branches from the third decision point 60 back to the step 58 wherein the duty cycle of the engage valve 41 is incremented by a predetermined amount.

This loop of the algorithm 50 is repeated until the actual position $CLT_{POS}$ of the release bearing 33 is greater than or equal to the sum of the second constant value K2 with the disengaged position $DIS_{POS}$. As the duty cycle of the engage valve 41 is incremented as described above, some of the pressurized fluid contained within the chamber 38 will be is vented to the reservoir. As a result, the force exerted by the engagement springs 12d will eventually begin to move the release bearing 33 in the engagement direction. When the actual position $CLT_{POS}$ of the release bearing 33 is greater than or equal to the sum of the second constant value K2 with the disengaged position $DIS_{POS}$, the algorithm 50 branches from the third decision point 60 to a step 61 wherein the start rate is defined as the current duty cycle of the engage valve 41. In this manner, the start rate can be determined by the electronic controller 20.

Figure 3B:
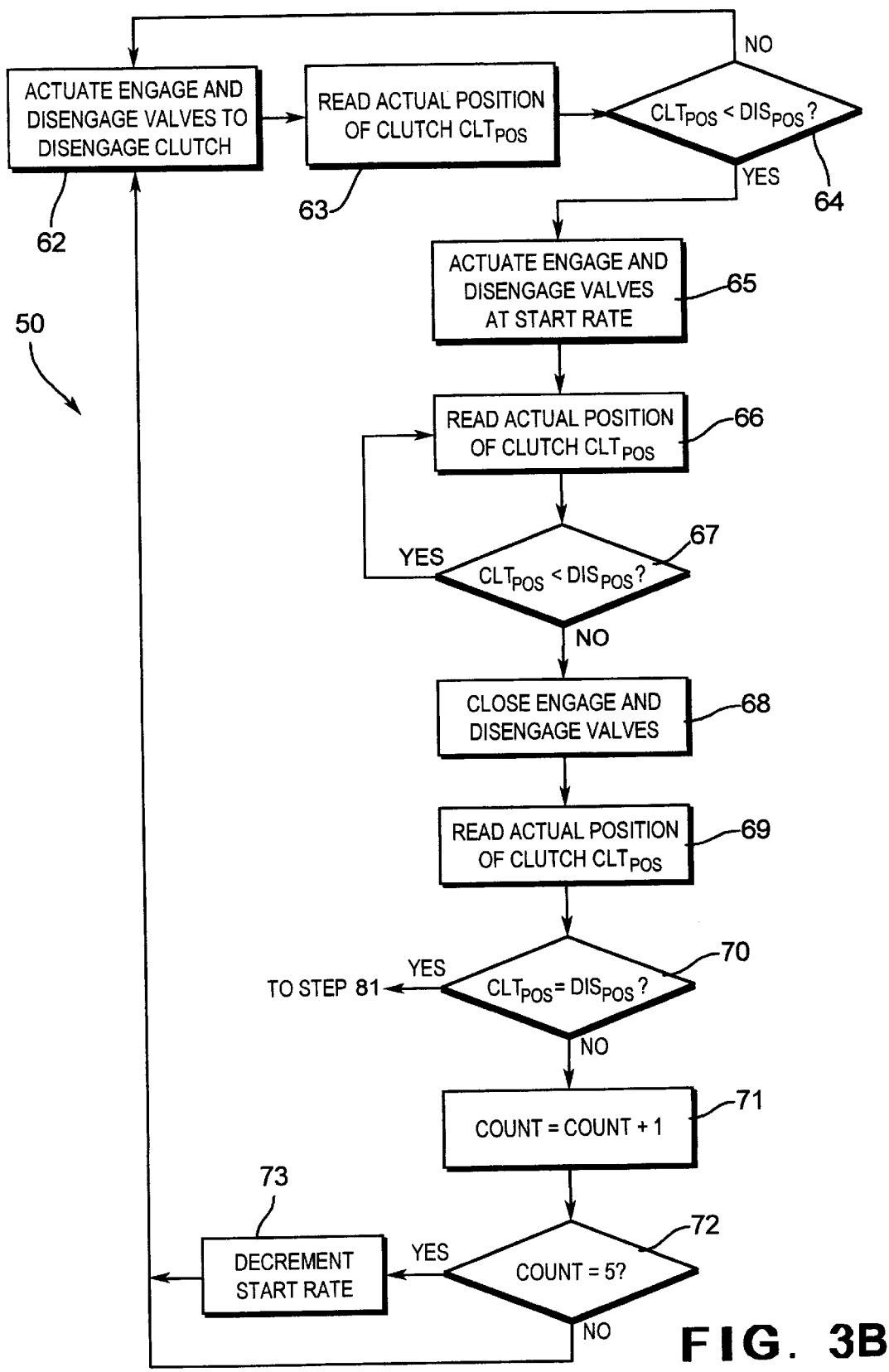

Thereafter, referring to FIG. 3B, the algorithm 50 enters a step 62 wherein the engage valve 41 and the disengage valve 42 are actuated by the electronic controller 20 to disengage the clutch 12 and return the release bearing 33 to the disengaged position $DIS_{POS}$. The algorithm 50 then enters a step 63 wherein the electronic controller 20 again reads the actual position $CLT_{POS}$ of the release bearing 33 of the clutch 12 from the clutch position sensor 22. In a fourth decision point 64, the actual position $CLT_{POS}$ of the release bearing 33 is compared with the disengaged position $DIS_{POS}$. If the actual position $CLT_{POS}$ of the release bearing 33 is greater than or equal to the disengaged position $DIS_{POS}$, the algorithm 50 branches from the fourth decision point 64 back to the step 63. This loop of the algorithm 50 continues until the actual position $CLT_{POS}$ of the release bearing 33 is less than the disengaged position $DIS_{POS}$.

When this occurs, the algorithm 50 branches from the fourth decision point 64 to a step 65 wherein the engage valve 41 and the disengage valve 42 are actuated by the electronic controller 20 to engage the clutch 12 at the above-determined start rate so as to slowly and accurately move the release bearing 33 in the engaged direction back to the disengaged position $DIS_{POS}$. The algorithm 50 then enters a step 66 wherein the electronic controller 20 again reads the actual position $CLT_{POS}$ of the release bearing 33 of the clutch 12 from the clutch position sensor 22. In a fifth decision point 67, the actual position $CLT_{POS}$ of the release bearing 33 is compared with the disengaged position $DIS_{POS}$. If the actual position $CLT_{POS}$ of the release bearing 33 is less than the disengaged position $DIS_{POS}$, the algorithm 50 branches from the fifth decision point 67 back to the step 66. This loop of the algorithm 50 continues until the actual position $CLT_{POS}$ of the release bearing 33 is greater than or equal to the disengaged position $DIS_{POS}$. Then, the algorithm 50 branches from the fifth decision point 67 to a step 68 wherein the engage valve 41 and the disengage valve 42 are closed, thus holding the release bearing 33 in its current position.

The algorithm 50 then enters a step 69 wherein the electronic controller 20 again reads the actual position $CLT_{POS}$ of the release bearing 33 of the clutch 12 from the clutch position sensor 22. In a sixth decision point 70, the actual position $CLT_{POS}$ of the release bearing 33 is again compared with the disengaged position $DIS_{POS}$. If the actual position $CLT_{POS}$ of the release bearing 33 is equal to (or within a predetermined range of) the disengaged position $DIS_{POS}$, the start rate determination is successfully completed. Thus, the algorithm 50 branches from the sixth decision point 70 to a step 81 (described further below) to await the beginning of the engagement process.

In most instances, the algorithm 50 will successfully determine the start rate in the manner described above. However, in some instances, it has been found that the start rate may be set too high to permit accurate positioning of the release bearing 33 at the disengaged position $DIS_{POS}$ (or, for that matter, some other desired position). If the start rate is too high, the release bearing 33 will overshoot past the disengaged position $DIS_{POS}$ when the engage valve 41 is closed at step 68. When this situation occurs, the algorithm 50 will branch from the sixth decision point 70 to a step 71 wherein a variable COUNT (which previously was initialized to zero) is incremented by one. The variable COUNT represents the number of detected overshooting occurrences of the release bearing 33 and may be expressed in absolute terms (i.e., simply as the number of overshooting occurrences detected) or in relative terms (i.e., the number of overshooting occurrences detected per unit time). The algorithm 50 then enters a seventh decision point 72 wherein it is determined if the variable COUNT has reached a third constant value K3. The third constant value K3 represents an undesirable number of such overshooting occurrences, also either in absolute or relative terms. For example, the third constant K3 may be set to represent five overshooting occurrences within an eight second period of time. Also, the third constant may be selected to represent overshooting occurrences during movement of the release bearing 33 in either or both of the engagement and disengagement directions.

If the variable COUNT has not reached the predetermined value, then the algorithm 50 branches from the seventh decision point 72 back to the step 62 wherein the engage valve 41 and the disengage valve 42 are actuated by the electronic controller 20 to disengage the clutch 12 and re-attempt to position the release bearing 33 at the disengaged position $DIS_{POS}$. If the variable COUNT reaches the predetermined value, it is assumed that an unacceptable number of attempts (or attempts per unit time) have been made to re-position the release bearing 33 at the disengaged position $DIS_{POS}$. Thus, the algorithm 50 branches from the seventh decision point 72 to a step 73 wherein the start rate is decremented by a predetermined amount. Lastly, the algorithm 50 returns to the step 62 wherein the engage valve 41 and the disengage valve 42 are actuated by the electronic controller 20 to disengage the clutch 12 and re-attempt to position the release bearing 33 at the disengaged position $DIS_{POS}$ using the slower start rate. In this manner, the start rate can be adjusted if the initial determination proves to be too high to permit accurate positioning of the release bearing 33 at a desired location.

Figure 4:
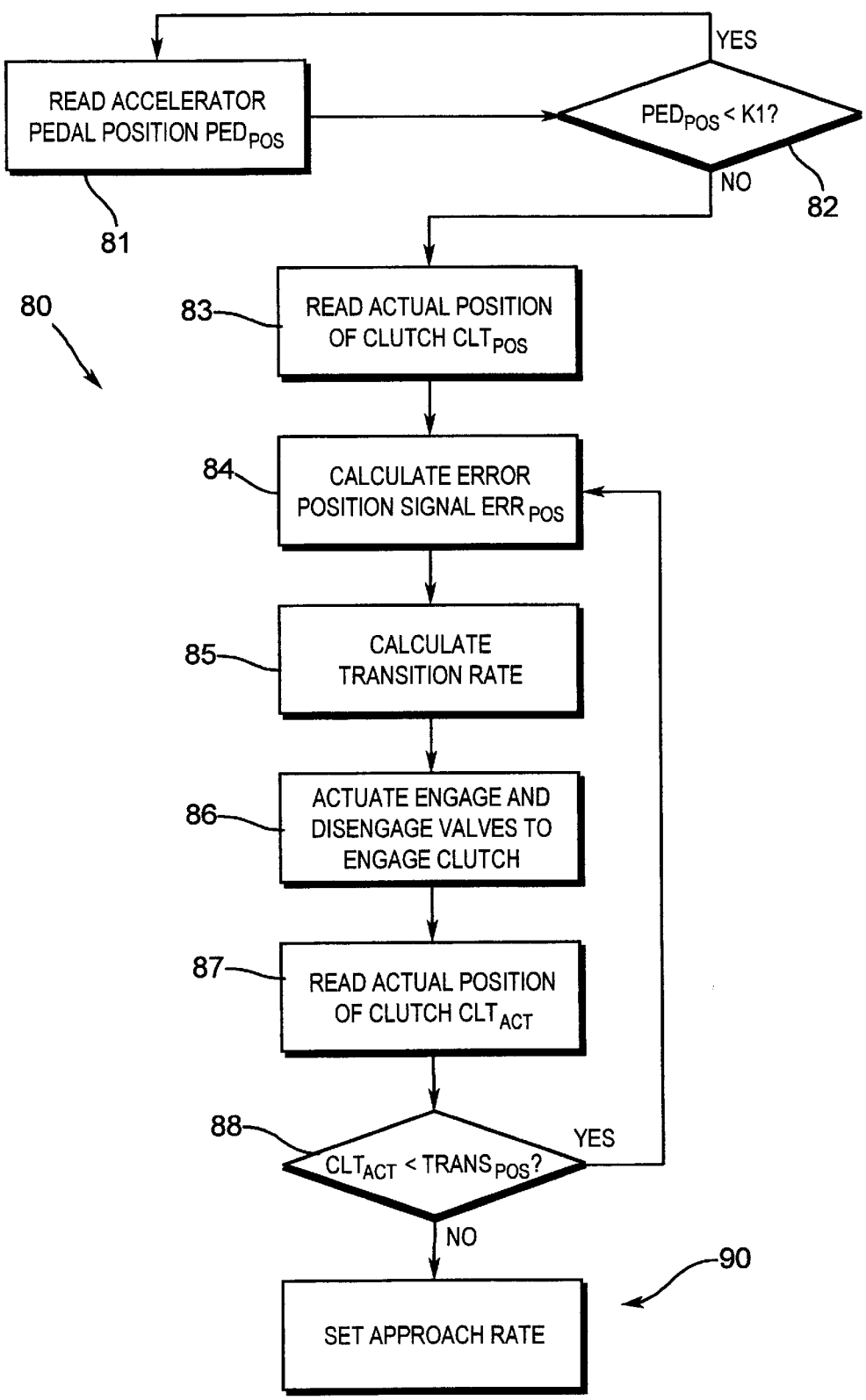
FIG. 4 is a flow chart of an algorithm for controlling the movement of the release bearing of the clutch in its transition movement from the disengaged position to the transition point.

Having determined the start rate for movement of the release bearing 33, the electronic controller 20 waits for a signal from the operator of the vehicle to initiate the engagement of the clutch 12. Typically, this signal will be represented by movement of the accelerator pedal of the vehicle, although other operator-initiated signals are contemplated within the scope of this invention. Referring now to FIG. 4, there is illustrated a flow chart of an algorithm, indicated generally at 80, for controlling the movement of the release bearing 33 of the clutch 12 in its transition movement from the disengaged position $DIS_{POS}$ to the transition point $TRANS_{POS}$. In the first step 81 of the algorithm 80, the electronic controller 20 reads the accelerator pedal position signal $PED_{POS}$ from the engine controller 23. Then, the algorithm 80 enters a first decision point 82 wherein the electronic controller 20 compares the accelerator pedal position signal $PED_{POS}$ with the first constant value K1. As discussed above, the first constant value K1 is selected to be relatively small, corresponding to essentially no depression of the accelerator pedal of the vehicle by the operator. If the accelerator pedal position signal $PED_{POS}$ is less than the constant value K1, then it is assumed that the operator does not wish to move the vehicle. In this instance, the algorithm 80 branches from the first decision point 82 to the first step 81. This loop of the algorithm 80 is repeated until the accelerator pedal position signal $PED_{POS}$ is greater than or equal to the constant value K1, wherein it is assumed that the operator wishes to move the vehicle. When this occurs, the algorithm 80 branches from the first decision point 82 to a step 83 wherein the electronic controller 20 reads the actual position $CLT_{POS}$ of the release bearing 33 of the clutch 12 from the clutch position sensor 22.

In the next step 84 of the algorithm 80, the electronic controller 20 calculates a position error signal $ERR_{POS}$. The position error signal $ERR_{POS}$ can be calculated as the difference between the actual position $CLT_{POS}$ of the release bearing 33 and the transition point $TRANS_{POS}$. As discussed above, the transition point $TRANS_{POS}$ is selected to be relatively near, but spaced apart from, the position of the release bearing 33 at which the driven disc assembly of the clutch 12 is initially engaged by the flywheel and the pressure plate (i.e., the kiss point). For the purposes of this invention, it is assumed that the location of the kiss point is known, and that the location of the transition point $TRANS_{POS}$ is calculated as being a predetermined distance from the kiss point. A number of kiss point determining algorithms are known in the art. As will be discussed below, the kiss point is typically determined by measuring an increase in torque at the output shaft of the engine, indicating the onset of clutch engagement. In any event, the position error signal $ERR_{POS}$ is calculated as the difference between the actual position $CLT_{POS}$ of the release bearing 33 and the transition point $TRANS_{POS}$.

Having determined the start rate using the algorithm 50 discussed above, and further having calculated the position error signal $ERR_{POS}$, the algorithm 80 next enters a step 85 wherein the electronic controller 20 sets the transition rate as being equal to the sum of the start rate and a factor related to the magnitude of the position error signal $ERR_{POS}$. Thus, as will become apparent below, the transition rate will vary with the actual position $CLT_{POS}$ of the release bearing 33 relative to the transition point $TRANS_{POS}$. In the next step 86, the electronic controller 20 actuates the engage valve 41 and the disengage valve 42 (by means of the respective solenoids 44 and 45) to effect movement of the release bearing 33 of the clutch 12 according to the calculated transition rate. Thus, the clutch engagement process is initiated.

The algorithm 80 next enters a step 87 wherein the electronic controller 20 again reads the actual position $CLT_{POS}$ of the release bearing 33 of the clutch 12 from the clutch position sensor 22. Then, the algorithm 80 enters a second decision point 88 wherein the electronic controller 20 compares the actual position $CLT_{POS}$ of the release bearing 33 with the known transition point $TRANS_{POS}$. If the actual position $CLT_{POS}$ of the release bearing 33 is less than the transition point $TRANS_{POS}$, then it is assumed that the release bearing 33 has not been moved sufficiently far in the engagement direction. In this instance, the algorithm 80 branches from the second decision point 88 back to the fourth step 84, wherein the position error signal $ERR_{POS}$ is re-calculated as the difference between the most recent actual position $CLT_{POS}$ of the release bearing 33 and the transition point $TRANS_{POS}$. This loop of the algorithm 80 continues until the actual position $CLT_{POS}$ of the release bearing 33 is greater than or equal to the transition point $TRANS_{POS}$.

When it is determined that the release bearing 33 of the clutch 12 has been is moved to the transition point $TRANS_{POS}$, the initial transition movement of the release bearing 33 is completed. Having moved the release bearing 33 of the clutch 12 from the disengaged position to the transition point $TRANS_{POS}$, the electronic controller 20 must now move the release bearing 33 from the transition point $TRANS_{POS}$ to the kiss point $KISS_{POS}$. Thus, the algorithm 80 branches to an algorithm, indicated generally at 90 and discussed below in detail, wherein the engagement rate is re-set to the approach rate to continue the engagement process.

Thus, it will be appreciated that the above-discussed algorithm 80 is effective to initiate movement of the release bearing 33 of the clutch 12 in the engagement direction whenever the accelerator pedal of the vehicle is sufficiently depressed. When this occurs, the algorithm 80 sets the transition rate of movement in accordance with the actual position $CLT_{POS}$ of the release bearing 33 relative to the transition point $TRANS_{POS}$. The electronic controller 20 exerts closed loop control over the transition movement of the release bearing 33 by monitoring the actual position thereof relative to the transition point $TRANS_{POS}$. During the course of this transition movement, the transition rate is adjusted in accordance with the actual position $CLT_{POS}$ of the release bearing 33 relative to the transition point $TRANS_{POS}$. It will be appreciated that inasmuch as some of the steps in the algorithm 80 are identical with some of the steps in the algorithm 50, portions of the two algorithms 50 and 80 may be integrated with one another.

Figure 5:
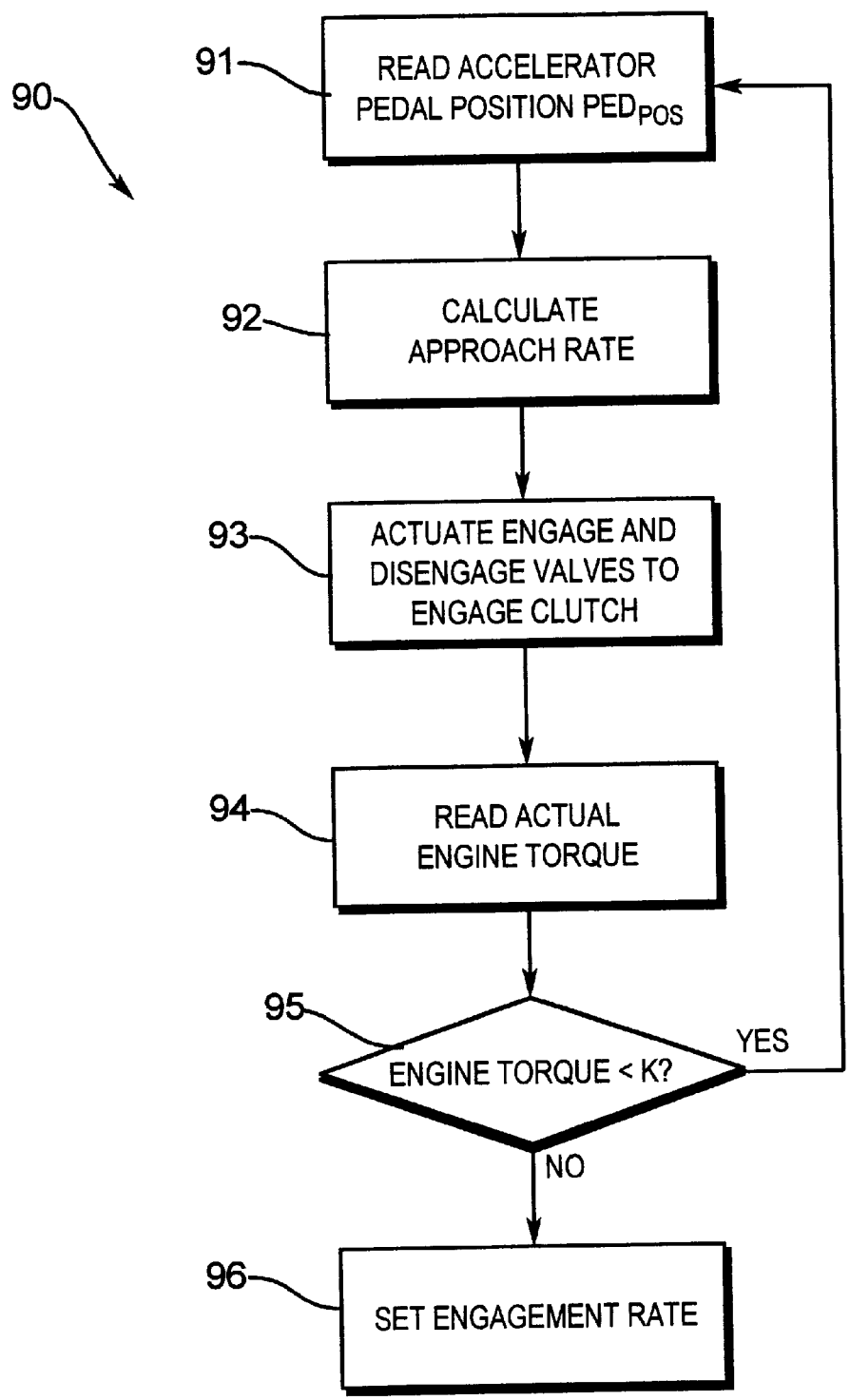
FIG. 5 is a flow chart of an algorithm for controlling the movement of the release bearing of the clutch in its approach movement from the transition point to the kiss point.

Referring now to FIG. 5, there is illustrated a flow chart of the algorithm 90 for controlling the movement of the release bearing 33 of the clutch 12 in its approach movement from the transition point $TRANS_{POS}$ to the kiss point. As mentioned above, the algorithm 90 is effective to re-set the engagement rate to the approach rate to continue the engagement process. In the first step 91 of the algorithm 90, the electronic controller 20 reads the accelerator pedal position signal $PED_{POS}$ from the engine controller 23. Then, the algorithm 90 enters a step 92 wherein the electronic controller 20 sets the approach rate as being equal to the sum of the start rate and a factor related to the magnitude of the accelerator pedal position signal $PED_{POS}$. As an example, that factor may be equal to the amount of depression of the accelerator pedal divided by the total range of movement thereof, and further multiplied by a gain constant which is determined empirically and based upon the specific structure of the system. Regardless of the specific method for calculating this factor, it will be appreciated that the approach rate of the release bearing 33 is related to the amount of depression of the accelerator pedal. In the next step 93, the electronic controller 20 actuates the engage valve 41 and the disengage valve 42 (by means of the respective solenoids 44 and 45) to effect movement of the release bearing 33 of the clutch 12 according to the calculated approach rate. Thus, the clutch engagement process is continued.

In the next step 94 of the algorithm 90, the electronic controller 20 reads the engine torque signal generated by the engine controller 23 to the engine 11 over the data bus line 26. The algorithm 90 next enters a decision point 95 wherein the engine torque signal is compared with a constant value K. The constant value K is selected to represent a predetermined amount of torque generated by the engine 11. As mentioned above, the kiss point is the position of the release bearing 33 at which the first measurable amount of torque is transmitted through the clutch 12 to the transmission 13. To accommodate this transmission of torque without stalling, the engine controller 23 increases the engine torque signal to the engine 11. Thus, if the engine torque signal is less than the constant value K, then it is assumed that the release bearing 33 has not yet reached the kiss point. In that instance, the algorithm 90 branches from the decision point 95 back to the step 91 wherein the electronic controller 20 reads the accelerator pedal position signal $PED_{POS}$ from the engine controller 23. This loop in the algorithm 90 continues until the engine torque signal is greater than or equal to the constant value K. When this occurs, it is assumed that the release bearing 33 of the clutch 12 has reached the kiss point. Thus, the algorithm 90 branches from the decision point 95 to a step 96 wherein the engagement rate is set to complete the engagement process.

Movement of the release bearing 33 at the engagement rate through the third range of movement can be accomplished in any known manner. As suggested above, the clutch 12 is gradually engaged during the engagement movement of the release bearing 33 from the kiss point to the engaged position to prevent the engine from stalling and avoid undesirable sudden jerking movement of the vehicle. The electronic controller 20 can be programmed to automatically alter the duty cycle of the engage valve during this engagement movement of the release bearing 33 in response to sensed operating conditions. For example, the electronic controller 20 can be responsive to the amount of depression of the accelerator pedal from the pedal position sensor 24 and the engine speed for adjusting the duty cycle of the engage valve. However, any known algorithm may be used to control the movement of the release bearing 33 in its final engagement movement from the kiss point to the engaged position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch for selectively connecting an engine to a transmission in a vehicle having an accelerator pedal comprising:

an input member adapted to be connected to the engine;

an output member adapted to be connected to the transmission;

a release bearing that is movable at an approach rate from a disengaged position, wherein no measurable amount of torque is transmitted from said input member to said output member, to a kiss point, wherein a first measurable amount of torque is transmitted from said input member to said output member;

a sensor for generating a signal that is representative of the position of the accelerator pedal;

a controller for generating a control signal that is representative of the approach rate of the clutch, said controller being responsive to said accelerator pedal sensor signal for adjusting the magnitude of said control signal in response thereto; and a clutch actuator for controlling the approach rate of the clutch in response to said control signal.

2. The clutch defined in claim 1 wherein said controller generates said control signal as a sum of a predetermined start rate and a factor related to the magnitude of said accelerator pedal position signal.

3. The clutch defined in claim 2 wherein said factor is representative of the sensed amount of depression of the accelerator pedal divided by the total range of movement thereof, and further multiplied by a gain constant which is determined empirically and based upon the specific structure of the system.

4. The clutch defined in claim 2 wherein said factor is representative of the sensed amount of depression of the accelerator pedal divided by the total range of movement thereof, and further multiplied by a gain constant.

5. The clutch defined in claim 1 wherein said controller continues to generate said control signal until a measurable amount of torque is transmitted through the clutch.

6. The clutch defined in claim 5 wherein said controller is responsive to an engine torque signal generated to the engine for determining when a measurable amount of torque is transmitted through the clutch.

7. The clutch defined in claim 6 wherein said controller is responsive to an increase in the engine torque signal generated to the engine for determining when a measurable amount of torque is transmitted through the clutch.

8. The clutch defined in claim 6 wherein said controller is responsive to an increase in the engine torque signal generated to the engine that is greater than a predetermined amount for determining when a measurable amount of torque is transmitted through the clutch.

\* \* \* \* \*